(12) United States Patent
Saunders

(10) Patent No.: US 6,209,099 B1
(45) Date of Patent: Mar. 27, 2001

(54) SECURE DATA PROCESSING METHOD AND SYSTEM

(75) Inventor: Keith A. Saunders, Dundee (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 08/892,320

(22) Filed: Jul. 14, 1997

(30) Foreign Application Priority Data

Dec. 18, 1996 (GB) .................................... 9626241

(51) Int. Cl.$^7$ .................................................. H04L 9/00
(52) U.S. Cl. .......................... 713/200; 380/282; 380/283; 380/259; 705/51; 705/57; 713/189; 713/193
(58) Field of Search ................... 713/200, 189, 713/191–194; 395/186; 380/4, 23, 259, 260, 262, 277, 281–283

(56) References Cited

U.S. PATENT DOCUMENTS

| | | | |
|---|---|---|---|
| 4,910,774 | * | 3/1990 | Barakat .................................. 380/23 |
| 5,224,160 | | 6/1993 | Paulini et al. . |
| 5,343,527 | | 8/1994 | Moore . |
| 5,434,870 | * | 7/1995 | Benton et al. ....................... 371/37.1 |
| 5,473,692 | | 12/1995 | Davis . |
| 5,530,749 | * | 6/1996 | Easter et al. .............................. 380/3 |
| 5,644,638 | * | 7/1997 | Thiriet ..................................... 380/25 |
| 5,781,723 | * | 7/1998 | Yee et al. .............................. 395/186 |
| 5,802,592 | * | 9/1998 | Chess et al. .......................... 711/164 |
| 5,844,986 | * | 12/1998 | Davis ....................................... 380/4 |
| 5,892,902 | * | 4/1999 | Clark .............................. 395/187.01 |
| 5,958,051 | * | 9/1999 | Renaud et al. ...................... 713/200 |

FOREIGN PATENT DOCUMENTS

| | | |
|---|---|---|
| 0707270 | 4/1996 | (EP) . |
| 0 816 970 A2 | * 1/1998 | (EP) ................................. G06F/1/00 |
| WO99/17255 | * 4/1999 | (JP) ................................. G06T/7/00 |

OTHER PUBLICATIONS

Kruse D: "Guarding the Operating System" Siemens Magazine of Computers & Communications, (COM), vol. 14, No. 5, Sep. 1986, pp. 14–16, XP000611029.
Schneier, Applied Cryptography, 2nd edition, pp. 34–41, 1996.*

* cited by examiner

Primary Examiner—Tod Swann
Assistant Examiner—Paul E. Callahan
(74) Attorney, Agent, or Firm—Gregory A. Welte

(57) ABSTRACT

The present invention concerns a secure data processing method and system in which the user or operator of the system can trust that all of the software and hardware components of the system have been authenticated.

The invention provides a data processing system in which there is a central processor unit, memory and a security circuit in the form of an application specific integrated circuit. The security circuit has a cryptographic engine and a cryptographic key store.

The cryptographic engine operates on the contents of the cryptographic key store to generate a digital signature. Means are provided to generate a digital signature from a software or hardware component to be checked for authenticity and to compare the digital signature from the component with the generated digital signature. An indication of the authenticity of the component is generated as a result of the comparison. The components of the system that can be checked include the boot firmware for the system, the operating system and plug-in cards for the system.

2 Claims, 3 Drawing Sheets

SECURE DATA PROCESSING METHOD AND SYSTEM

BACKGROUND OF THE INVENTION

The present invention concerns a secure data processing method and system and is of particular application to a financial terminal.

In a data processing system it is usual to provide a programmable central processor unit, memory and other software and hardware components. It is desirable to provide a software and hardware environment where the user or operator of the system can trust all of the software and hardware components of the system. To achieve this objective some means has to be provided to decide whether the components of the system have been compromised either at initial installation of the components or at a later stage when new or upgraded components are introduced to the system.

For a data processing system including a programmable central processor unit it is important to authenticate the operating system of the central processor unit. If plug-in cards are used to provide upgrades to the functionality of the system it is also important to authenticate these plug-in cards. The means to authenticate the components of the data processing system must be such as to provide security for the authentication process itself if the authentication process is to be reliable in detecting any compromise of the components of the system.

SUMMARY OF THE INVENTION

It is therefore an object of the present invention to provide an effective method and system for testing one or more components of a data processing system in order to determine the authenticity of the tested component or components.

According to the present invention there is provided a method of determining the authenticity of one or more system components of a data processing system which also includes a programmable central processor unit, memory, a security circuit having a cryptographic engine, and a cryptographic key store, the method comprising the steps of entering one or more keys into the cryptographic key store, operating on the contents of the cryptographic key store by means of the cryptographic engine to generate a digital signature referenced to a component of the system to be authenticated, generating a digital signature from the component to be authenticated, and providing an indication of authenticity by comparing the digital signature generated by the cryptographic engine with that generated from the component to be authenticated.

Further according to the present invention there is provided a data processing system including one or more components to be checked for authenticity, a programmable central processing unit, memory and a security circuit having a cryptographic engine and a cryptographic key store for storing one or more cryptographic keys, the cryptographic engine being adapted to operate on the contents of the cryptographic key store to generate a digital signature referenced to a component of the system to be checked for authenticity, and means being provided to generate a digital signature from the component to be checked for authenticity and to provide an indication of authenticity by comparing the digital signature generated by the cryptographic engine with that generated from the component to be authenticated.

BRIEF DESCRIPTION OF THE DRAWINGS

The invention will now be described, by way of example, with reference to the accompanying drawings in which.

DETAILED DESCRIPTION

Figure 1:
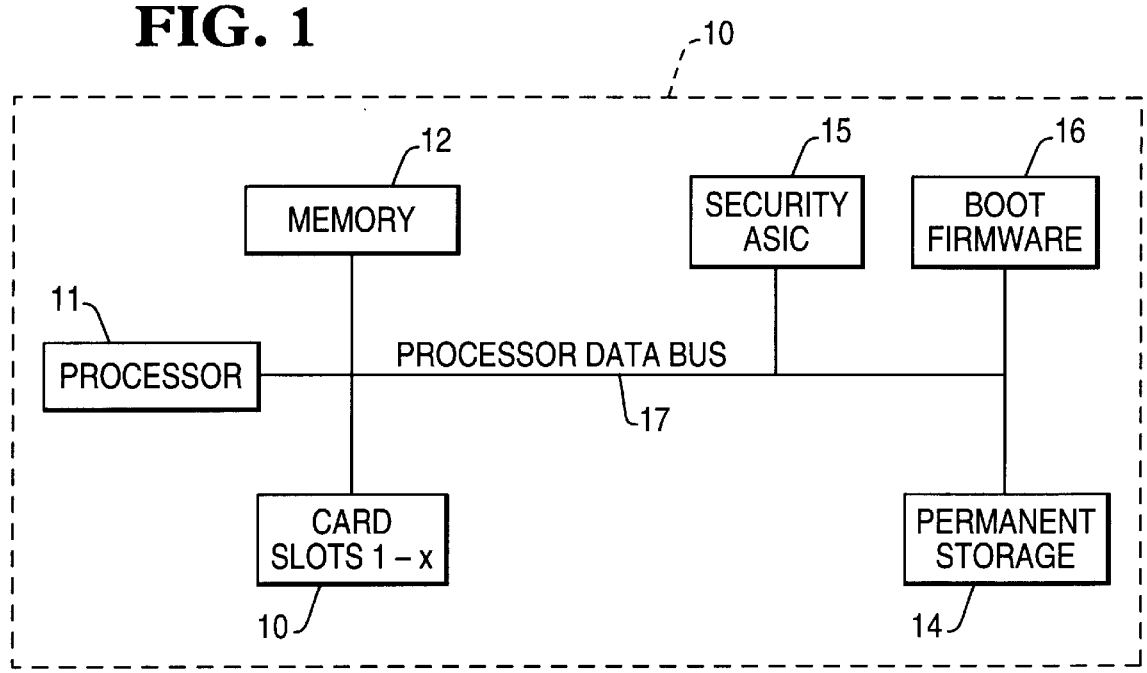
FIG. 1 shows a block diagram of a data processing system according to the present invention.

Referring first to FIG. 1, there is shown a data processing system 10 which may be an automatic teller system or a personal computer system. The system 10 has a central processor unit 11, a memory 12, provision for additional plug-in cards 13, permanent storage 14, a security circuit 15 in the form of an application specific integrated circuit (ASIC) and boot firmware 16. The components of the data processing system 10 are linked by means of a processor data bus 17 in conventional manner well understood by those skilled in the art. In addition the system runs under an operating system (OS) in a manner well understood in the art.

Figure 2:
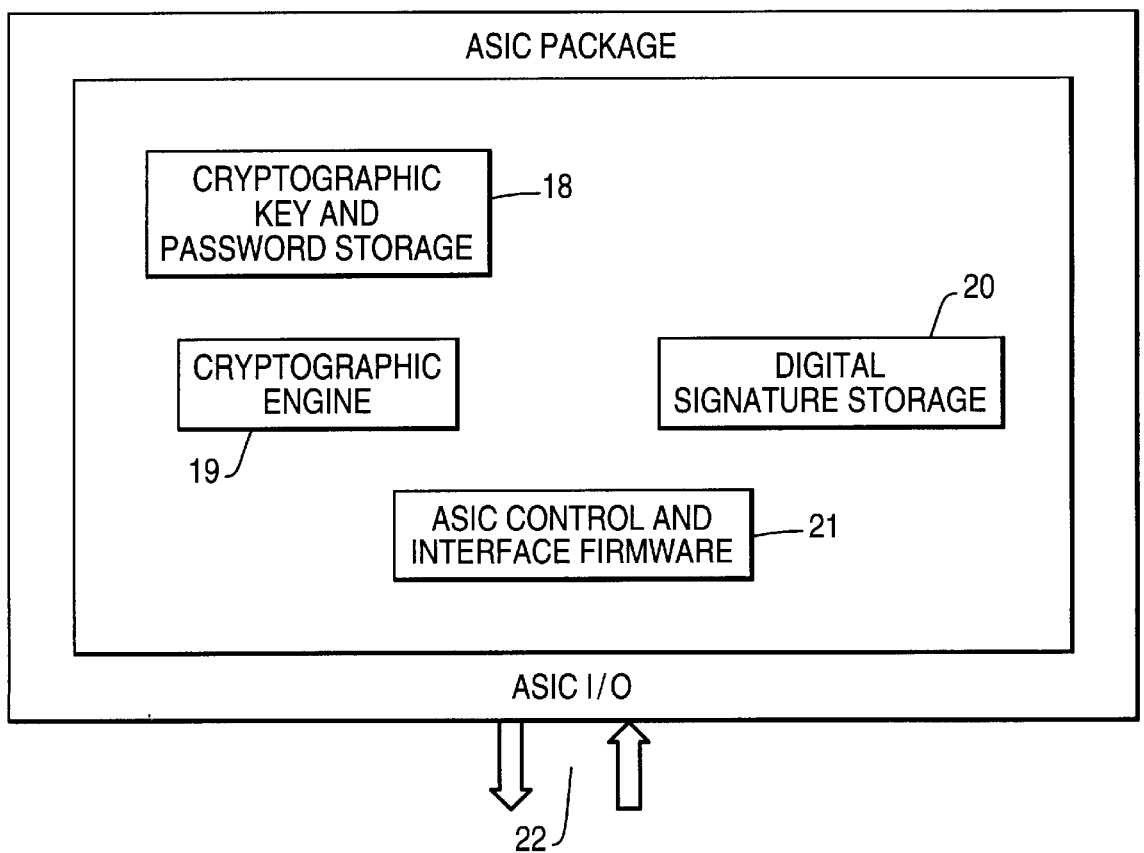
FIG. 2 shows detail of a security circuit included in the system of FIG. 1.

The security circuit 15 is shown in greater detail in FIG. 2. Referring now to FIG. 2, the circuit 15 includes a cryptographic key and password store 18, a cryptographic engine 19, a store 20 for a digital signature, control and interface firmware 21 and an I/O bus 22 communicating with the system bus 17. The cryptographic engine 19 supports both symmetric and asymmetric algorithms. The control and interfacing firmware 21 is designed to perform the initial start-up of the data processing system.

Means (not shown) are provided to allow the operator of the system to input keys and passwords into the security circuit 15. All the keys stored in the storage 18 are password protected, with the password defined (and changeable) by input from the user of the system. A key can therefore only be altered if the corresponding password is known and entered by the user.

The keys in the store 18 are present to allow system components including firmware components and software components to be authenticated. The components to be authenticated in the system of FIG. 1 include the operating system (OS), the firmware on the plug-in cards 13, and the boot firmware 16. The invention may be applied to a system which has either more or less system components to be authenticated than the system depicted in FIG. 1. For example a simpler system may not provide for the plug-in cards 13 and in this case provision may not be required to authenticate such cards.

Each of the components of the system which are to be authenticated includes a digital signature which is embedded in the firmware of the component. The digital signature is embedded at a predefined location and is created by the supplier of the component as part of the manufacturing process. The algorithm for generating the digital signature uses an symmetric key pair, with the vendor supplier keeping the private key secure and distributing the public key with the component to be authenticated. The public key is entered into the circuit 15 when the component is installed into the data processing system 10.

The creator of each of the cryptographic keys entered into the circuit 15 will depend on the source of the component to which the keys relate. The keys may be symmetric or asymmetric and validate the respective components of the system according to the cryptographic process determined within the security circuit 15. The authentication process is tamper proof by reason of the fact that the process is contained within the security ASIC 15 and it is not feasible to alter the contents of this ASIC. The security system can not be disabled.

A number of keys are pre-defined as shown in the following Table 1:

TABLE 1

| Key Name | Type | Use Creator | |
|---|---|---|---|
| Boot | Asymmetric | Validation of boot firmware by ASIC 15 ASIC The creator of boot firmware | |
| Cards (1–x) | Asymmetric | Validation of firmware of cards (1–x) cards (1–x) | The creator of the card firmware for |
| OS | Symmetric | Validation of operating system boot Automatically generated by the ASIC (15) | |

Figure 3:
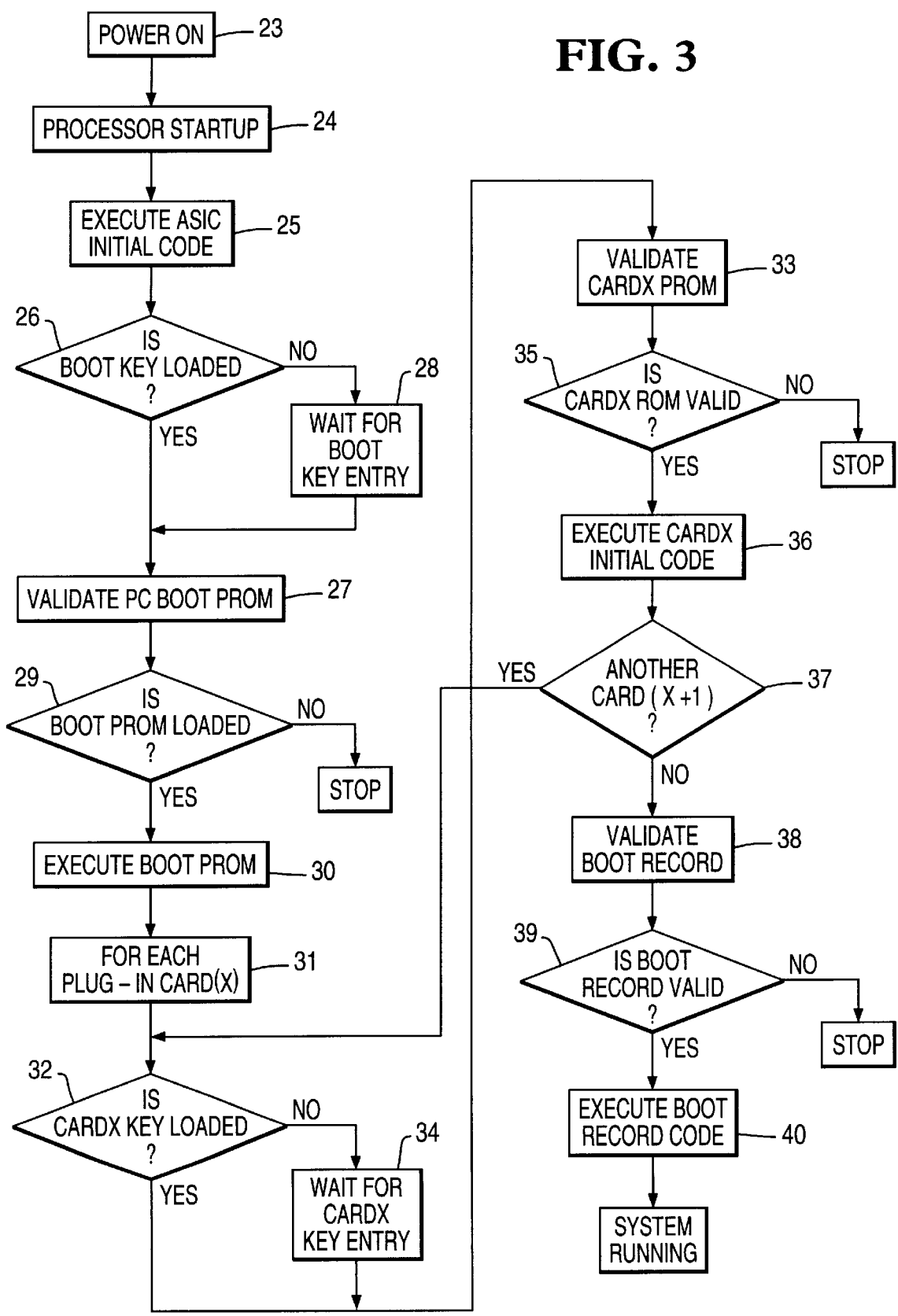
FIG. 3 shows a flow diagram of the operation of the system of FIGS. 1 and 2.

The process of starting up the data processing system of FIGS. 1 and 2 is shown in the flow diagram of FIG. 3. Referring now to FIG. 3, the power on step 23 is followed by processor start-up step 24 and the execution at step 25 of the initial code of the ASIC 15. A decision is taken at step 26 whether the boot key has been loaded and validation of the boot PROM 16 takes place in step 27 either directly or via step 28 if the boot key has to be entered. The process of validation in step 27 comprises the generation within the ASIC 15 of the expected digital signature using the 'boot' key. The generated digital signature is then compared to the actual digital signature from the boot PROM 16 and an indication is generated in step 29 whether the boot PROM is valid. If not valid, the process in FIG. 3 is stopped.

If the boot PROM 16 is validated, the process continues through the step 30 to execute the boot PROM and then begins in step 31 to operate on each of the plug-in cards 13. In the flow diagram of FIG. 3, each card x (where x is the number of each card taken in turn) is checked by determining in step 32 if the corresponding card key has been entered in the ASIC 15 and validation proceeds in step 33 either directly if the key has been entered, or via the step 34 if the key has still to be entered. Validation of each plug-in card 13 is achieved by to comparison of the digital signature generated for that card by the cryptographic engine 19 with the digital signature embedded in the card using the appropriate 'card x' key (where x is the number of each card taken in turn. An indication is generated in step 35 whether the card is valid. If the card is valid, the card initial code is executed in step 36.

If there are succeeding cards to be validated, this is determined in step 37 and the validation of all the cards continues until all have been validated. Following validation of the cards, the boot record is validated in step 38 and an indication provided in step 39 if the boot record is valid. The process of validation in step 38 is performed by generating a digital signature for the operating system boot using the 'OS' key and comparing this against the digital signature stored in the digital signature store 20. If the boot record is valid, the boot record code is executed in step 40 and the system is running.

Figure 4:
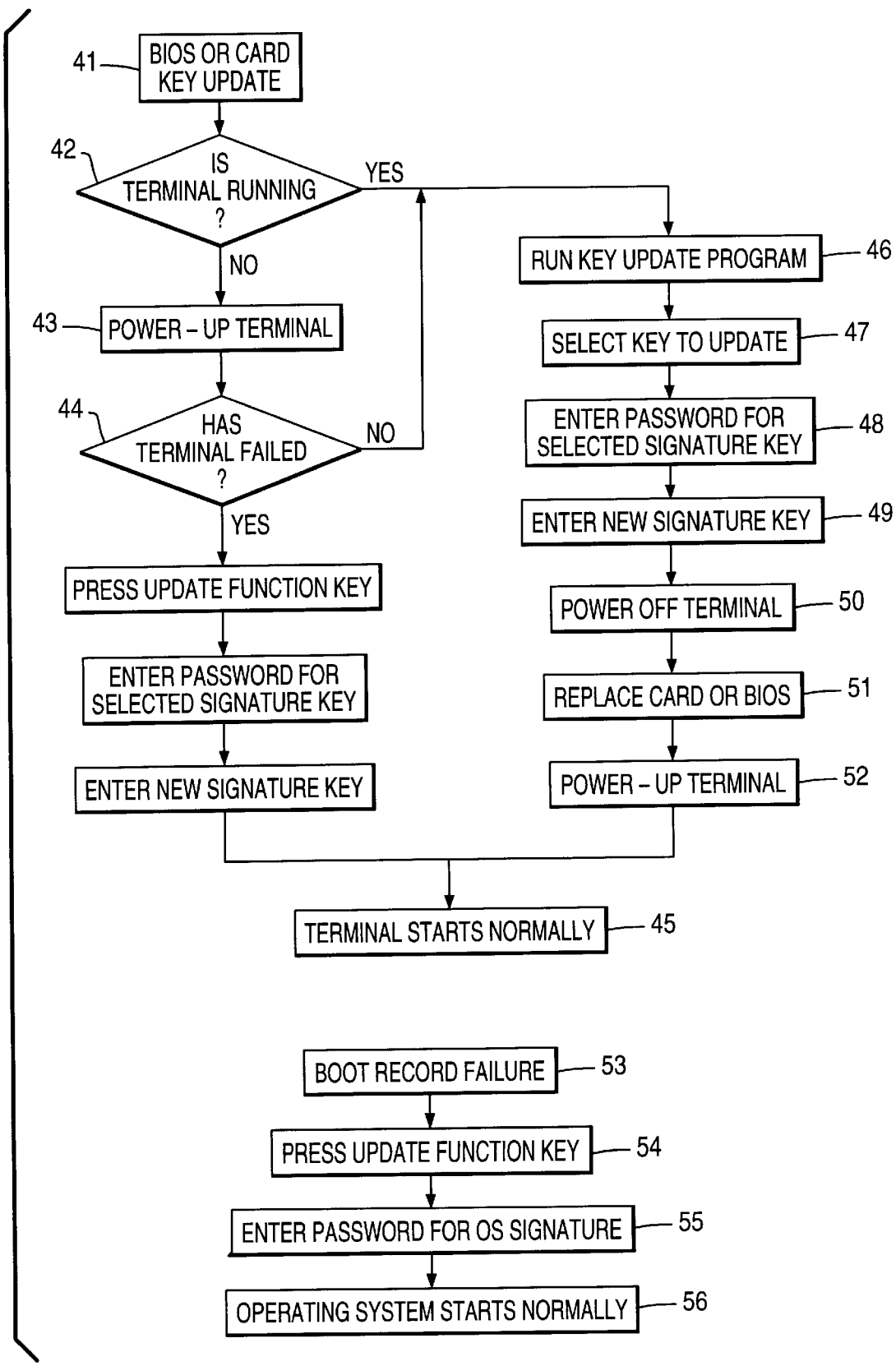
FIG. 4 shows a flow diagram relating to the update of cryptographic keys used in the system of FIGS. 1 and 2.

Referring now to FIG. 4, the method of updating the keys will be described. To commence an operating system or card key update, from step 41, a check is made whether the terminal is running in step 42. If not running, the system is powered up in step 43 and a check made in step 44 whether the system has failed. If yes, an update function key is pressed, a password for the selected key is entered and the new key is entered to arrive at the step 45 where the system starts normally.

If at step 44 the terminal has not failed, the key update program is run in step 46 and the operator of the system selects which key to update in step 47. The password for the selected key is entered at step 48, the new key is entered at step 49 and the system is powered down in step 50. The system component (either a card 13 or the BIOS) is replaced at step 51 and the terminal powered up again at step 52.

If there is a boot record failure as shown in step 53, an update function key is pressed at step 54 and the password for the operating system signature is entered at step 55. This results in the operating system digital signature being regenerated. The operating system operates normally at step 56.

Once the operating system is started, the security is the responsibility of the operating system software. The security ASIC 15 can then provide validation of digitally signed software.

It will be apparent that the system described allows a trusted start up sequence that is required for successfully providing a complete secure system. It is envisaged that the keys could be stored in storage outside the security ASIC 15. For example they could be encrypted under a master key which is held within the security ASIC 15 which would make it impossible to alter or replace the keys.

What is claimed is:

1. A method of determining the authenticity of an operating system in a data processing system which includes a programmable central processing unit, a memory, a security circuit having a cryptographic engine, and a cryptographic key store, the method comprising the steps of:
   a) starting up the data processing system, and entering one or more keys into the cryptographic key store;
   b) operating on the contents of the cryptographic key store by means of the cryptographic engine to generate a digital signature referenced to the operating system;
   c) generating a digital signature from the operating system; and
   d) providing an indication of authenticity by comparing the digital signature generated by the cryptographic engine with that generated from the operating system.

2. A data processing system including an operating system to be checked for authenticity, the data processing system comprising:
   a) an automated teller system which includes a programmable central processing unit;
   b) a memory;
   c) a security circuit including
      i) a cryptographic engine and
      ii) a cryptographic key store for storing one or more cryptographic keys,
      the cryptographic engine being adapted to operate on the contents of the cryptographic key store to generate a digital signature referenced to the operating system; and
   d) means for
      i) generating a digital signature from the operating system, and
      ii) providing an indication of authenticity by comparing the digital signature generated by the cryptographic engine with that generated from the operating system.

* * * * *